(12) United States Patent
Phan et al.

(10) Patent No.: US 6,215,616 B1
(45) Date of Patent: *Apr. 10, 2001

(54) DISK DRIVE SPINDLE MOTOR WITH WIRE GUIDE INSERT

(75) Inventors: Bang Phan; Joseph H. Sassine, both of Rochester, MN (US)

(73) Assignee: Western Digital Corporation, Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,161

(22) Filed: Jan. 4, 1999

(51) Int. Cl.[7] ............................. G11B 17/08; H02K 7/08
(52) U.S. Cl. ................................ 360/99.08; 360/98.07; 310/67 R
(58) Field of Search ....................... 360/98.07, 99.04, 360/99.08; 310/67 R, 71, 90, 156, 268, 51

(56) References Cited

U.S. PATENT DOCUMENTS

| | | | |
|---|---|---|---|
| 5,138,209 | * 8/1992 | Chuta et al. ................ | 310/67 R |
| 5,173,814 | 12/1992 | Elsasser et al. . | |
| 5,459,361 | * 10/1995 | Morioka ..................... | 310/67 R |
| 5,493,159 | * 2/1996 | Norris ........................ | 310/71 |
| 5,528,092 | * 6/1996 | Ohta .......................... | 310/67 R |
| 5,598,047 | * 1/1997 | Sakuragi et al. ........... | 310/67 R |
| 5,831,355 | * 11/1998 | Oku ........................... | 310/42 |
| 5,945,751 | * 8/1999 | Hans et al. ................. | 310/67 R |

* cited by examiner

Primary Examiner—Brian E. Miller
(74) Attorney, Agent, or Firm—Milad G Shara; W Chris Kim

(57) ABSTRACT

A spindle motor for a disk drive includes a shaft, an upper bearing, a lower bearing, a stator, a hub and wire guide body. The upper bearing surrounds the shaft. The lower bearing surrounds the shaft, is spaced-apart from the upper bearing, and includes an inner race. The stator surrounds the shaft between the upper bearing and the lower bearing, and includes a stator wire extending from a stator core. The hub is concentrically positioned about the stator. The wire guide body is secured between the shaft and the lower bearing, and includes a generally cylindrically shaped surface and a channel. The channel is sized to receive the stator wire and is formed adjacent to the cylindrically shaped surface such that the channel opens into at least one of the shaft and the inner race.

14 Claims, 4 Drawing Sheets

DISK DRIVE SPINDLE MOTOR WITH WIRE GUIDE INSERT

BACKGROUND OF THE INVENTION

1. Field of the Invention

The present invention relates to hard disk drives. More particularly, it relates to a disk drive spindle motor including a wire guide insert for facilitating rapid assembly at reduced costs.

2. Description of the Prior Art and Related Information

A huge market exists for mass-market host computer systems such as servers, desktop computers, and laptop computers. To be competitive in this market, a hard disk drive must be relatively inexpensive and must accordingly embody a design that is adapted for low cost mass production. Numerous manufacturers compete in this expansive market and collectively conduct substantial research and development, at great annual cost, to design and develop innovative hard disk drives to meet increasingly demanding customer requirements.

Each of the various contemporary mass-marketed hard disk drive models provides relatively large data storage capacity, often in excess of 1 gigabyte per drive. To this end, there exists substantial competitive pressure to develop mass-market hard disk drives that have even higher capacities and that provide rapid access to stored data. Another requirement to be competitive in this market is that the hard disk drive must conform to a selected standard exterior size and shape often referred to as a "form factor". Generally, capacity is desirably increased without increasing the form factor, or the form factor is reduced without decreasing capacity.

Satisfying these competing constraints of low-cost, small size, high capacity, and rapid access requires innovation in each of numerous components or subassemblies. Typically, the main subassemblies of a hard disk drive are a head disk assembly and a printed circuit board assembly.

The head disk assembly includes an enclosure including a base and a cover; at least one disk having at least one recording surface; a spindle motor causing each disk to rotate; and an actuator arrangement. The actuator arrangement includes a separate transducer for each recording surface, and is movable to position each transducer relative to the recording surface. The printed circuit board assembly includes circuitry for processing signals and controlling operation of the drive.

A disk drive spindle motor typically includes a base, a central shaft, an upper bearing, a lower bearing, a stator and a rotor (or "hub"). The hub normally forms a flange to which the disk(s) is attached. The shaft is attached at one end to the base. The hub is concentrically positioned about the shaft. To this end, the upper and lower bearings maintain the hub in this concentric position such that the hub is rotatable about the shaft. The stator includes a series of coils or wires wrapped around a core and is concentrically positioned about the shaft, adjacent the hub. Leading portions of the stator wires extend downwardly from the core and are electrically connected to the printed circuit board assembly. With this general configuration, the various coils of the stator are selectively energized, via signals from the printed circuit board assembly to form an electromagnet that pulls/pushes on a magnet otherwise associated with the hub, thereby imparting a rotational motion onto the hub. Rotation of the hub results in rotation of the attached disk(s).

Several different disk drive spindle motor designs are currently available, each conforming generally with the basic description provided above. For example, one design is referred to as a "top-down" spindle motor. The top-down spindle motor design includes a stator sized to be concentrically positioned about the lower bearing. In other words, the stator has an inner diameter greater than an outer diameter of the lower bearing. The hub forms a slot within which the stator is disposed such that the hub is directly secured to the upper and lower bearings. Notably, during assembly of a top-down spindle motor, the stator wires are readily directed from the stator core to the printed circuit board assembly in that no rotating parts, such as the lower bearing and the shaft, present an obstacle to desired positioning.

In addition to the top-down spindle motor design, other spindle motor configurations have been devised to satisfy certain performance enhancements. For example, the overall data storage capacity of a disk drive can be increased by adding additional disks beyond the number typically found with a top-down spindle motor. Further, it may be necessary to increase the rate at which the hub (and therefore the disks) rotate. To accommodate additional disks, a hub that is taller than that normally associated with a top-down spindle motor is required. Unfortunately, the top-down design may not provide sufficient motor volume to drive an elongated hub with multiple disks. To resolve this potential problem, a "split bearing" spindle motor has been engineered.

The split bearing spindle motor is generally similar to the top-down design. As the name implies, however, the split bearing design positions the stator directly between the upper and lower bearings, as opposed to outside of the lower bearing. The upper bearing, stator and lower bearing are effectively aligned along the shaft, and surrounded by the hub. This approach allows for an increase in motor volume for a taller hub so that additional disks can be mounted to the hub. Further, the split bearing design has proven to be stable at increased rotational speeds.

The split bearing spindle motor design is generally more expensive than a top-down spindle motor due, in part, to certain manufacturing issues. For example, as previously described, during assembly, leading portions of the stator wires must be directed downwardly from the stator core to the printed circuit board assembly for requisite electrical connection. Unlike the top-down design, with a split bearing spindle motor, the hub, lower bearing and shaft present a physical barrier to extension of the stator wires. Because the stator is positioned directly above the lower bearing, the hub and lower bearing obstruct a direct path from the stator core. A solution to this problem is to gouge a slot into the shaft adjacent the lower bearing. The stator wires are then passed around the lower bearing via the slot. Notably, the stator wires cannot be passed through the hub and/or the lower bearing as they are both rotating parts. The slot is normally formed by a machining operation and the stator wires are manually fed through the slot; the manual feeding of the stator wires through the slot is labor intensive and is therefore relatively expensive in terms of mass production. An additional manufacturing concern resides in the fact that a fast-drying adhesive is normally used to secure the lower bearing to the shaft. Thus, if any difficulties are encountered in maintaining the stator wire within the gouged slot during assembly of the lower bearing to the shaft, the adhesive may not set properly, rendering the motor unusable. Finally, imparting a slot into a high precision item such as the shaft may cause increased vibration of the shaft as a result of the slot decreasing the stiffness of the shaft.

U.S. Pat. No. 5,173,814 ("the '814 patent") discloses one alternative way of solving the stator wire guide problem associated with assembly of disk drive spindle motors. The '814 patent provides in one instance forming a passage in the shaft through which the stator wires are guided to the printed circuit board assembly. In a second instance, the '814 patent describes use of a bearing support ring having an internal bore. The bearing support ring is secured between the lower bearing and the shaft. With this configuration, the stator wires must be manually fed through the internal bore in the bearing support ring. Because the stator wires are quite thin and relatively flexible, it is likely difficult to thread the stator wires through the bore in an expedited fashion. Additionally, due to space limitations between the stator and lower bearing upon final assembly, it would be difficult to feed the stator wires through the internal bore once the support ring has been secured to the shaft.

Accordingly, substantial research and development efforts have been expended to provide an improved spindle motor design that facilitates rapid assembly while minimizing manufacturing costs and which maintains sufficient stiffness in the spindle motor shaft.

SUMMARY OF THE INVENTION

The present invention can be regarded as a spindle motor for a disk drive. The spindle motor includes a stationary shaft, an upper bearing, a lower bearing, a stator, a hub and a wire guide body. The shaft defines a longitudinal axis. The upper bearing and the lower bearing both surround the shaft, with the lower bearing being spaced-apart from the upper bearing in direction along the longitudinal axis. The lower bearing includes an inner race. The stator surrounds the shaft between the upper bearing and the lower bearing, and includes a stator wire and a stator core. The stator wire has a leading portion and is wound around the stator core such that the leading portion extends from the stator core. The hub is concentrically positioned about the stator. Finally, the wire guide body is secured between the shaft and the lower bearing, and includes a generally cylindrically shaped surface and a channel. The channel is sized to receive the leading portion of the stator wire and is formed adjacent to the cylindrically shaped surface. With this configuration, the channel opens into at least one of the shaft and the inner race.

The present invention can also be regarded as a disk drive comprising a base, a spindle motor and a disk. The spindle motor is attached to the base and includes a stationary shaft, an upper bearing, a lower bearing, a stator, a hub and a wire guide body. The upper bearing and the lower bearing both surround the shaft, with the lower being spaced-apart from the upper bearing in a direction along a longitudinal axis defined by the shaft. The lower bearing includes an inner race. The stator surrounds the shaft between the upper bearing and the lower bearing and includes a stator wire and a stator core. The stator wire has a leading portion and is wound around the stator core such that the leading portion extends from the stator core. The hub is concentrically positioned about the stator. The wire guide body is secured between the shaft and the lower bearing and includes a generally cylindrical shaped surface and a channel. The channel is sized to receive the leading portion of the stator wire and is formed adjacent to the cylindrically shaped surface such that the channel opens into at least one of the shaft and the inner race. Finally, the disk is mounted on the hub.

DETAILED DESCRIPTION OF A PREFERRED EMBODIMENT

Figure 1:
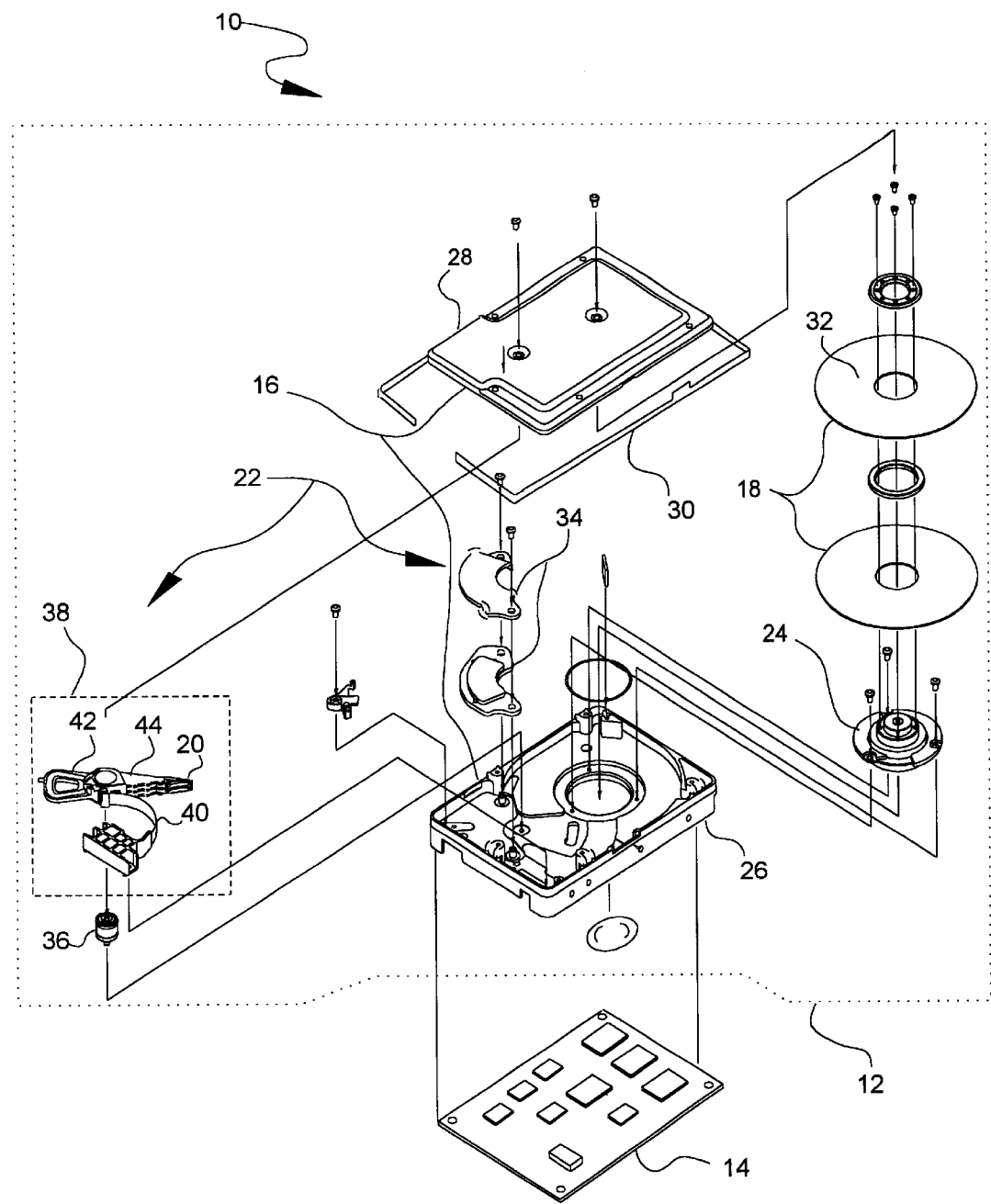
FIG. 1 is an exploded view of a hard disk drive in accordance with the present invention.

As shown in FIG. 1, a disk drive 10 embodying one preferred embodiment of the present invention includes a head disk assembly 12 and a printed circuit board assembly 14. The printed circuit board assembly 14 is suitably secured to an exterior of the head disk assembly 12 and controls operation of various components thereof.

The head disk assembly 12 includes an enclosure 16, a magnetic disk 18, a magnetic transducer 20, a rotary actuator arrangement 22 and a spindle motor generally indicated at 24. As described in greater detail below, the magnetic disk 18, the magnetic transducer 20, the rotary actuator arrangement 22 and the spindle motor 24 are contained within the enclosure 16.

The enclosure 16 comprises a base 26 and a cover 28. The enclosure 16 is sealed to provide a relatively contaminant-free interior for remaining components of the head disk assembly 12. Suitably, a tape seal 30 is used to seal the enclosure 16.

The magnetic disk 18 and the magnetic transducer 20 are positioned within an interior of the enclosure 16. The magnetic disk 18 includes a recording surface 32. Suitably, the magnetic disk 18 has a substrate formed from aluminum or aluminum alloy, with the recording surface including magnetic material deposited on the aluminum substrate. The particular embodiment shown in FIG. 1 includes a stack of two disks 18 providing four recording surfaces 32, and includes four magnetic transducers 20. Of course, the number of disks 18 may be less than or greater than 2. The number of transducers 20 corresponds with the number of disks 18.

The rotary actuator arrangement 22 provides for positioning of the magnetic transducers 20 over a selected area of the recording surfaces 32 of the magnetic disks 18. The rotary actuator arrangement 22 includes a permanent-magnet arrangement generally indicated at 34, a pivot bearing cartridge 36 and a head stack assembly 38. The pivot bearing cartridge 36 includes a stationary shaft secured to the enclosure 16 to define an axis of rotation for the rotary actuator arrangement 22. The head stack assembly 38 includes a flex circuit assembly 40, a coil 42 and actuator arms 44. Each one of the magnetic transducers 20 is coupled to a respective one of the arms 44 via respective load beams ("suspensions"). During use, circuitry (not shown) causes current to conduct through the coil 42, and because the coil 42 lies in the magnetic field provided by the permanent magnet arrangement 34, a torque is applied to the head stack assembly 38. The amount and direction of that torque is subject to control by a servo system that controls the rotary position of the magnetic transducer 20 relative to the respective recording surface 32 of the magnetic disk 18. The disk 18 is mounted to the spindle motor 24 and causes each disk 18 to spin, preferably at a constant angular velocity.

Figure 2:
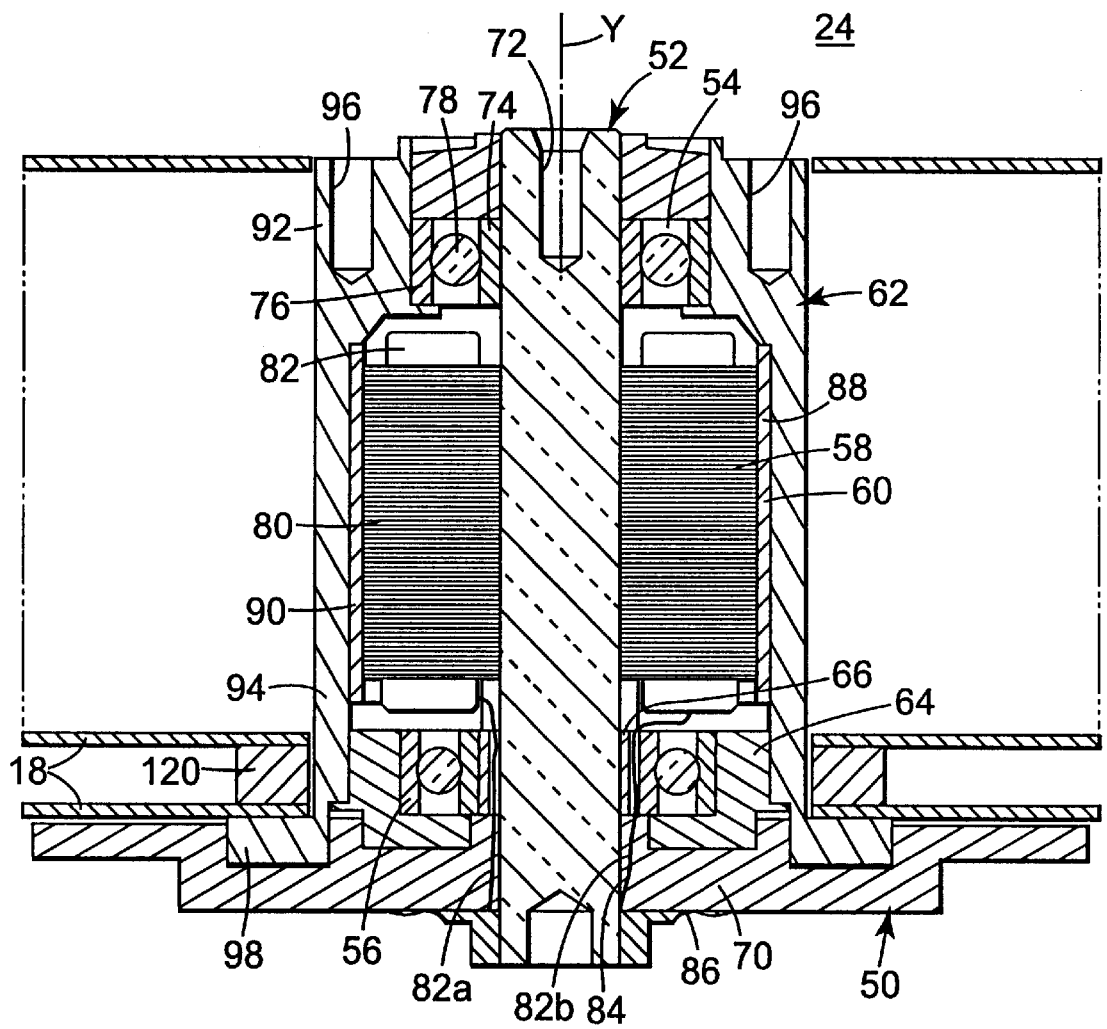
FIG. 2 is an enlarged, cross-sectional view of a portion of FIG. 1 which includes the spindle motor and a plurality of disks.

The spindle motor 24 is shown in more detail in FIG. 2. The spindle motor 24 includes a spindle motor base 50, a stationary shaft 52, an upper bearing 54, a lower bearing 56, a stator 58, a magnet 60, a hub 62, a connector ring 64 and a wire guide body 66. Details of the various components are provided below. In general terms, however, the shaft 52 is secured to the spindle motor base 50. The upper bearing 54 and the lower bearing 56 are spaced-apart along the shaft 52 and rotatably secure the hub 62 about the shaft 52. To this end, the connector ring 64 couples the hub 62 to the lower bearing 56. The magnet 60 is connected to the hub 62. The wire guide body 66 is secured between the shaft 52 and the lower bearing 56. It will be recognized that the spindle motor 24 depicted in FIG. 2 is a split bearing design.

The spindle motor base 50 is made of a rigid material, such as aluminum, and is suitably sized to be received by the base 26 (FIG. 1) of the enclosure 16 (FIG. 1). Similarly, the shaft 52 is made of a rigid material, such as aluminum or steel, and is suitably sized to be received by the spindle motor base 50. As shown in FIG. 2, the shaft 52 suitably has a uniform diameter and is configured to extend in a perpendicular fashion from a central portion 70 of the spindle motor base 50 so as to define a longitudinal axis Y. Suitably, the shaft 52 includes a bore 72 suitably sized to receive a screw for securing the shaft 52 to the enclosure 16 (FIG. 1).

The upper bearing 54 and the lower bearing 56 each include an inner race 74, an outer race 76 and bearing balls 78. The inner race 74 is associated with the outer race 76 so as to contain the balls 78. The inner race 74, the outer race 76 and the balls 78 are suitably made from a metal such as stainless steel or a non-metallic material such as ceramic material. While the upper bearing 54 and the lower bearing 56 are highly similar in construction, the lower bearing 56 may be slightly smaller than the upper bearing 54. Further, the inner race 74 of the lower bearing 56 may have a larger diameter than the inner race 74 of the upper bearing 54. In a preferred embodiment, the upper and lower bearings are the same size; in such a preferred embodiment, the area of the shaft adjacent to the inner race 74 of the upper bearing 54 would define a stepped protrusion such that the upper bearing's inner race would abut the stepped protrusion. With such a configuration, the upper and lower bearings would line up radially. In other words, relative to the shaft, the respective inner diameters of the inner races will be the same as well as the respective outer diameters of the outer races.

The stator 58 preferably has a ring configuration, and includes a stator core 80 and wires generally shown at 82. The wires 82 are wound about the stator core 80. Each of the individual wires, for example the wire 82a and the wire 82b, includes a leading portion 84 that extends away from (downwardly relative to the orientation of FIG. 2) the stator core 80, terminating in a leading end 86. The leading end 86 of each of the wires 82a and 82b is fed through a suitable opening (not shown) in the spindle motor base 50 and is electrically connected to a current supply, such as that provided by the printed circuit board assembly 14 (shown generally in FIG. 2). As shown in FIG. 2, the wires 82a, 82b may extend directly from a bottom of the core 80, or may instead be directed through a passage in the core 80 from a top to the bottom. In a preferred embodiment, the wires (including the wire 82a and the wire 82b) include at least three wires wound about the stator core 80, each of the three wires defining a separate coil able to selectively receive an independent current supply. With this configuration, energizing one set of coils forms an electromagnet at that particular coil.

The magnet 60 is suitably in the shape of a ring, and is defined by a first half 88 and a second half 90. With this configuration, each half defines suitably four magnetic poles.

The hub 62 is generally cylindrical in shape, definable by an upper portion 92 and a lower portion 94. The upper portion 92 is sized for attachment to the upper bearing 54 and to receive a clamping device (not shown) via bores 96. More particularly, the clamping device is mounted to the hub 62 via screws extending into the bores 96 to mount the stack of disks 18 to the hub 62. The lower portion 94 is integral with the upper portion 92 and terminates in a flange 98. The flange 98 extends in a radial fashion and is suitably sized to receive the disks 18. In a preferred embodiment, the hub 62 is formed from a hardened material such as aluminum or steel.

The connector ring 64 is suitably formed from a hardened material such as steel and is sized to couple the lower portion 94 of the hub 62 with the outer race 76 of the lower bearing 56. Further, the connector ring 64 provides a contaminant seal between the lower bearing 56 and the spindle motor base 50.

Finally, the wire guide body 66 is best described with reference to FIG. 3, which, for ease of illustration, omits the spindle motor base 50 (FIG. 2). The wire guide body 66 is ring-shaped and suitably forms a first channel 100 and a second channel 102. The wire guide body 66 is suitably made of a hardened material such as steel and is sized to be secured between the shaft 52 and the inner race 74 of the lower bearing 56. The wire guide body 66 preferably has a longitudinal height contiguous with that of the lower bearing 56. In this regard, the wire guide body 66 may assume a wide variety of dimensions, suitably corresponding to a height and inner diameter of the lower bearing 56. The first channel 100 is suitably sized to receive a plurality of wires including the first wire 82a whereas the second channel 102 is sized to receive a plurality of wires including the second wire 82b. Preferably, only a single channel such as first channel 100 is formed on the wire guide body 66 and the wires are inserted through the single channel.

Figure 3:
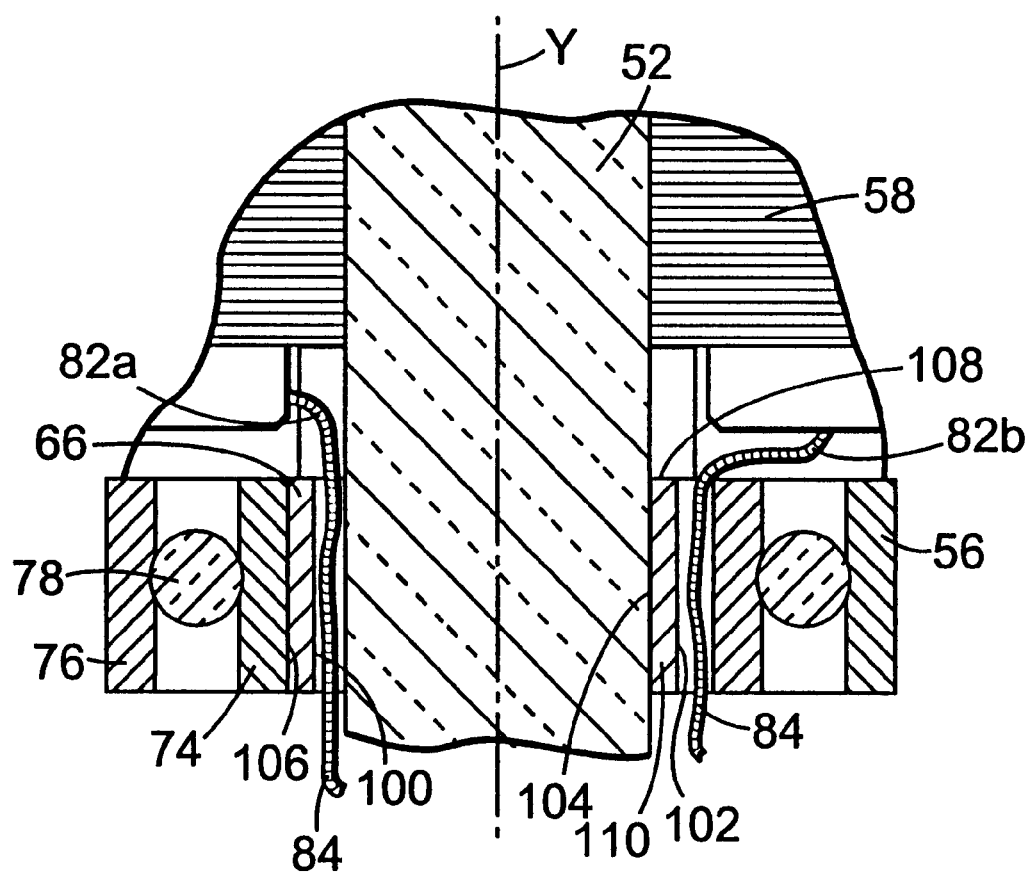
FIG. 3 is an enlarged, cross-sectional view of a portion of FIG. 2.
Figure 4:
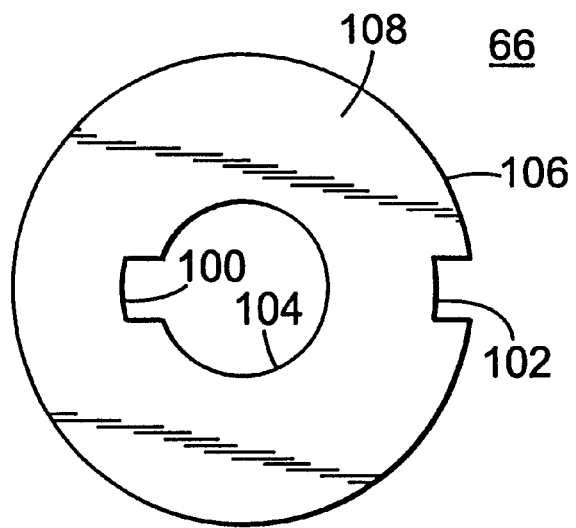
FIG. 4 is an enlarged, top plan view of a wire guide body.

With reference to FIGS. 3 and 4, the wire guide body 66 includes an inner wall 104, an outer wall 106, a top 108 and a bottom 110. The inner wall 104 is a generally cylindrically shaped surface extending between the top 108 and the bottom 110. Similarly, the outer wall 106 is a generally cylindrically shaped surface extending between the top 108 and the bottom 110. With this configuration in mind, the first channel 100 is formed adjacent to the inner wall 104 such that the channel is radially open, as best shown in FIG. 4. Further, the first channel 100 is axially open at the top 108 and the bottom 110. Upon final assembly, the first channel 100 opens into the shaft 52 as depicted in FIG. 3. Conversely, the second channel 100 is formed adjacent to the outer wall 106 such that the second channel 102 is radially open, as shown in FIG. 3. Additionally, the second channel 102 is axially open at the top 108 and the bottom 110. Upon final assembly (FIG. 3), the second channel 102 opens into the inner race 74 of the lower bearing 56.

The wire guide body 66 has been described as including the first channel 100 and the second channel 102. However, in a preferred embodiment as previously described, the wire guide body 66 includes only a single channel. In an alternative embodiment, the wire guide body 66 may include more than two channels. The channels may be formed adjacent to only one of the cylindrically shaped inner wall 104 or the outer wall 106. Further, the first channel 100 and/or the second channel 102 may be sized to receive more than one of the wires 82a, 82b. Finally, while the first channel 100 and the second channel 102 have been depicted as preferably being radially open along an entire longitudinal height of the wire guide body 66, only a portion of the channel 100 or 102 need be radially open.

Figure 5:
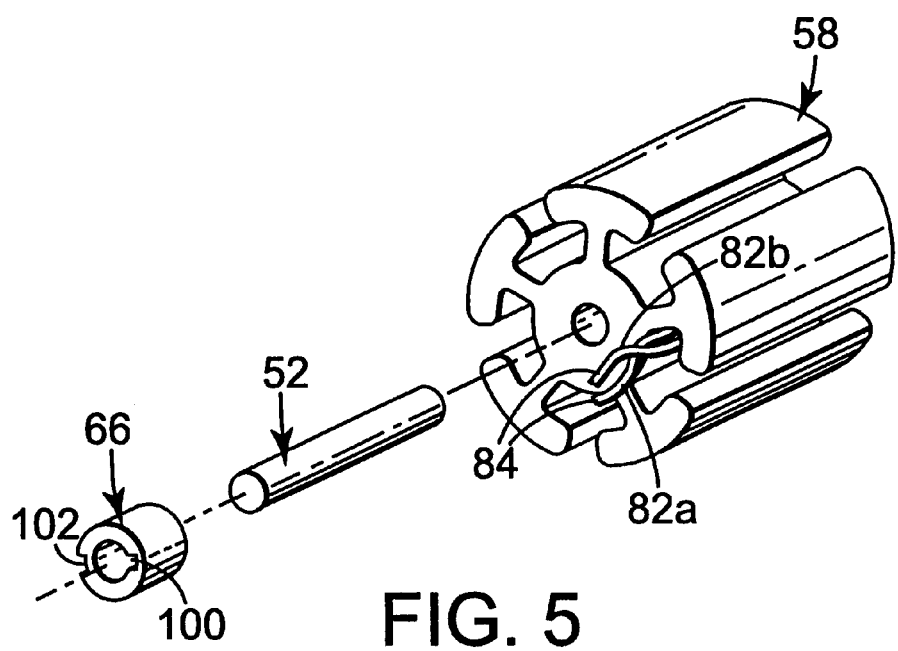
FIG. 5 is an exploded view of a portion of the spindle motor of FIG. 2.

Use of the wire guide body 66 facilitates a number of acceptable assembly procedures for the spindle motor 24, one of which is substantially as follows. With reference to FIG. 5, the stator 58 is secured to the shaft 52, such as by a press fitting operation. The leading portions 84 of the wires 82a, 82b are extended away from the stator core 80. The wire guide body 66 is then generally axially aligned with the shaft 52 below the stator 58. Where it is desirable for one or more of the wires to pass through the first channel 100 (i.e., proximal the shaft 52), for example the wire 82a, the leading portion 84 is radially inserted into the first channel 100. The wire guide body 66 is then secured to the shaft 52 below the stator 58, such as by a press fitting operation. Where it is desirable for one or more of the wires to pass through the second channel 102, for example the wire 82b, the leading portion 84 of the wire 82b is placed into the second channel 102. More particularly, the leading portion 84 is radially inserted into the second channel 102. Once inserted, the leading end 86 of the wire 82b extends from the bottom 110 of the wire guide body 66, as depicted in FIG. 3.

The lower bearing 56 is then secured about the wire guide body 66, such as with an adhesive. For example, the inner race 74 of the lower bearing 56 is secured to the outer wall 106 of the wire guide body 66. Returning to FIG. 2, the shaft 52 is then secured to the spindle motor base 50, such as by a press fitting operation. As shown in FIG. 2, the shaft 52 extends from the spindle motor base 50 in a generally perpendicular fashion to define the longitudinal axis Y. The upper bearing 54 is secured to the shaft 52. For example, the inner race 74 of the upper bearing 54 is secured to the shaft 52, axially spaced from the stator 58. The connector ring 64 is sealed to the outer race 76 of the lower bearing 56. The hub 62 and the magnet 60 are assembled and then positioned about the shaft 52 along a direction of the longitudinal axis Y. In this regard, the upper portion 92 is secured to the outer race 76 of the upper bearing 54 whereas the lower portion 94 is secured to the connector ring 64 otherwise coupled to the outer race 76 of the lower bearing 56. As shown in FIG. 2, the stator 58 is substantially coextensive with the magnet 60. With this configuration, the hub 62 can rotate about the shaft 52 via the upper and lower bearings 54, 56. The leading end 86 of the wires 82a, 82b is passed through the spindle motor base 50 and connected to the printed circuit board assembly 14..

It should be understood that the above-described assembly process may be altered. For example, the wire guide body 66 may be secured to the shaft 52 before the wire 82a is fed through the channel 100. Similarly, the lower bearing 56 may be adhered to the wire guide body 66 prior to securing the wire guide body 66 to the shaft 52.

Following assembly of the hub 62, the spindle motor 24 is mounted to the base 26 (FIG. 1). Finally, the disk(s) 18 is mounted to the hub 62, with a bottom disk abutting the flange 98. While the bottom disk is in direct contact with the flange 98, each disk 18 is centrally spaced apart radially from the hub 62. FIG. 2 depicts a stack of disks 18, with a spacer 120 between any two given disks 18. The disks 18, along with a respective spacer 120, are secured to the flange 98 by a clamping device (not shown) attached to the upper portion 92 of the hub 62.

During use, the spindle motor 24 operates as follows. Cyclical energization of the wires 82a, 82b of the stator 58 imparts a rotational torque onto the magnet 60 and thus the hub 62. The disks 18, otherwise attached to the hub 62, likewise rotate. Significantly, because the shaft 52 does not include a slot for the stator wires, the shaft 52 is stiffer. As a result, the shaft 52 will vibrate less during the operation of the disk drive.

The disk drive 10 (FIG. 1) having the spindle motor 24 in accordance with the present invention provides a distinct improvement over previous designs in terms of ease-of-assembly and performance. More particularly, utilization of a wire guide body incorporating at least one channel for directing stator wire(s) around the lower bearing eliminates the need to gouge a slot into the shaft. Further, because the channel is radially open, the stator wires are easily inserted into the channel, and the risk of wire damage during assembly decreases.

We claim:

1. A spindle motor for a disk drive, the spindle motor comprising:

a stationary shaft defining a longitudinal axis;

an upper bearing surrounding the shaft;

a lower bearing surrounding the shaft and being spaced-apart from the upper bearing in a direction along the longitudinal axis, the lower bearing having an inner race and defining a bottom surface;

a stator surrounding the shaft between the upper bearing and the lower bearing, the stator including a stator wire and a stator core, the stator wire having a leading portion, the stator wire being wound around the stator core such that the leading portion extends from the stator core;

a hub concentrically positioned about the stator; and a wire guide body secured between the shaft and the lower bearing such that a bottom end of the wire guide body is contiguous with the bottom surface of the lower bearing, the wire guide body including:

a generally cylindrically shaped surface, and a channel sized to receive the leading portion, the channel being formed adjacent to the cylindrically shaped surface such that the channel is adjacent to at least one of the shaft and the inner race.

2. The spindle motor of claim 1, wherein the cylindrically shaped surface defines a generally cylindrical inner wall having a diameter equal to an outer diameter of the shaft.

3. The spindle motor of claim 2, wherein at least a portion of the channel is open along the inner wall such that the channel is adjacent to the shaft.

4. The spindle motor of claim 1, wherein the cylindrically shaped surface defines a generally cylindrical outer wall having a diameter approximating an inner diameter of the inner race.

5. The spindle motor of claim 4, wherein the channel is open along the outer wall such that the channel is adjacent to the inner race.

6. The spindle motor of claim 1, wherein the cylindrically shaped surface defines a longitudinal height, the channel being open along the longitudinal height.

7. The spindle motor of claim 1, wherein the stator includes a plurality of stator wires, each wire having a leading portion, and further wherein the channel is sized to receive the leading portion of each of the plurality of stator wires.

8. The spindle motor of claim 1, wherein the stator includes a second stator wire having a leading portion, and further wherein the wire guide body includes a second generally cylindrically shaped surface and a second channel sized to receive the leading portion of the second stator wire, the second channel being formed adjacent to the second cylindrically shaped surface such that the second channel opens into at least one of the shaft and inner race.

9. The spindle motor of claim 1, wherein the channel defines an opening formed along the cylindrically shaped surface, the opening having a width greater than a diameter of the stator wire for allowing radial movement of the leading portion into the channel.

10. A disk drive comprising:

a base;

a spindle motor attached to the base, the spindle motor comprising:

a stationary shaft defining a longitudinal axis, an upper bearing surrounding the shaft, a lower bearing surrounding the shaft and being spaced-apart from the upper bearing in a direction along the longitudinal axis, the lower bearing having an inner race and defining a bottom surface, a stator surrounding the shaft between the upper bearing and the lower bearing, the stator including a stator wire and a stator core, the stator wire having a leading portion, the stator wire being wound around the stator core such that the leading portion extends from the stator core, a hub concentrically positioned about the stator, a wire guide body secured between the shaft and the lower bearing such that a bottom end of the wire guide is contiguous with the bottom surface of the lower bearing, the wire guide body including:

a channel sized to receive the leading portion, the channel being formed adjacent to the cylindrically shaped surface such that the channel is adjacent to at least one of the shaft and the inner race;

a disk mounted to the hub.

11. The disk drive of claim 10, wherein the channel is adjacent to the shaft.

12. The disk drive of claim 10, wherein the channel is adjacent to the inner race.

13. The disk drive of claim 10, wherein the stator includes a second stator wire having a leading portion, and further wherein the wire guide body includes a second generally cylindrically shaped surface and a second channel sized to receive the leading portion of the second stator wire, the second channel being formed adjacent to the second cylindrically shaped surface such that the second channel opens into at least one of the shaft and the inner race.

14. The disk drive of claim 10, wherein the channel defines an opening formed along the cylindrically shaped surface, the opening having a width greater than a diameter of the stator wire for allowing radial movement of the stator wire into the channel.

* * * * *